United States Patent
Frerking

(10) Patent No.: US 10,158,438 B2
(45) Date of Patent: *Dec. 18, 2018

(54) SYSTEM AND METHOD FOR BROADCAST STATION ADJACENCY

(71) Applicant: AT&T Mobility II LLC, Atlanta, GA (US)

(72) Inventor: Melvin Frerking, Norcross, GA (US)

(73) Assignee: AT&T MOBILITY II LLC, Atlanta, GA (US)

(*) Notice: Subject to any disclaimer, the term of this patent is extended or adjusted under 35 U.S.C. 154(b) by 31 days.

This patent is subject to a terminal disclaimer.

(21) Appl. No.: 15/187,131

(22) Filed: Jun. 20, 2016

(65) Prior Publication Data

US 2016/0301487 A1 Oct. 13, 2016

Related U.S. Application Data

(63) Continuation of application No. 14/690,930, filed on Apr. 20, 2015, now Pat. No. 9,374,180, which is a continuation of application No. 12/972,224, filed on Dec. 17, 2010, now Pat. No. 9,013,541, which is a continuation-in-part of application No. 12/642,189, filed on Dec. 18, 2009, now Pat. No. 8,610,832.

(51) Int. Cl.
| | |
|---|---|
| *H04N 5/38* | (2006.01) |
| *H04H 20/72* | (2008.01) |
| *H04H 20/42* | (2008.01) |
| *H04H 20/67* | (2008.01) |
| *H04W 24/02* | (2009.01) |

(52) U.S. Cl.
CPC .......... *H04H 20/72* (2013.01); *H04H 20/423* (2013.01); *H04H 20/67* (2013.01); *H04W 24/02* (2013.01)

(58) Field of Classification Search
CPC ....................................................... H04N 5/38
See application file for complete search history.

(56) References Cited

U.S. PATENT DOCUMENTS

| | | | |
|---|---|---|---|
| 5,809,395 | A | 9/1998 | Hamilton-Piercy et al. |
| 6,697,641 | B1 | 2/2004 | Shapira |
| 6,944,139 | B1 | 9/2005 | Campanella |
| 7,050,758 | B2 | 5/2006 | Dalgleish et al. |

(Continued)

*Primary Examiner* — Nasser Goodarzi
*Assistant Examiner* — Adil Ocak

(57) ABSTRACT

Disclosed herein are systems, methods, and non-transitory computer-readable storage media for broadcasting a local signal B that corresponds to a coverage hole in a remote signal B. The system includes a first transmitter at a first location and a second transmitter at the first location that transmits local signal B corresponding to remote signal B transmitted from a remote transmitter. The second transmitter broadcasts the local signal B to at least part of a coverage hole in a coverage area of remote signal B. Also disclosed is a method for consolidating allocated wireless spectrum. The method includes identifying a guard band in an allocated band of wireless spectrum, reassigning an existing channel occupying a portion of the allocated band of wireless spectrum to the guard band via selective single frequency network infill to yield a reassigned channel, and freeing the portion of the allocated band of wireless spectrum.

17 Claims, 11 Drawing Sheets

(56) References Cited

U.S. PATENT DOCUMENTS

| | | | | |
|---|---|---|---|---|
| 7,376,180 B2* | 5/2008 | Feher | .................. | H04B 7/0871 |
| | | | | 375/219 |
| 2006/0014491 A1 | 1/2006 | Cleveland | | |
| 2006/0030262 A1 | 2/2006 | Anderson et al. | | |
| 2006/0264174 A1* | 11/2006 | Moss | ..................... | H04B 1/525 |
| | | | | 455/16 |
| 2010/0093307 A1 | 4/2010 | Hui et al. | | |
| 2013/0083876 A1* | 4/2013 | Suzuki | ................ | H04B 1/1027 |
| | | | | 375/350 |

* cited by examiner

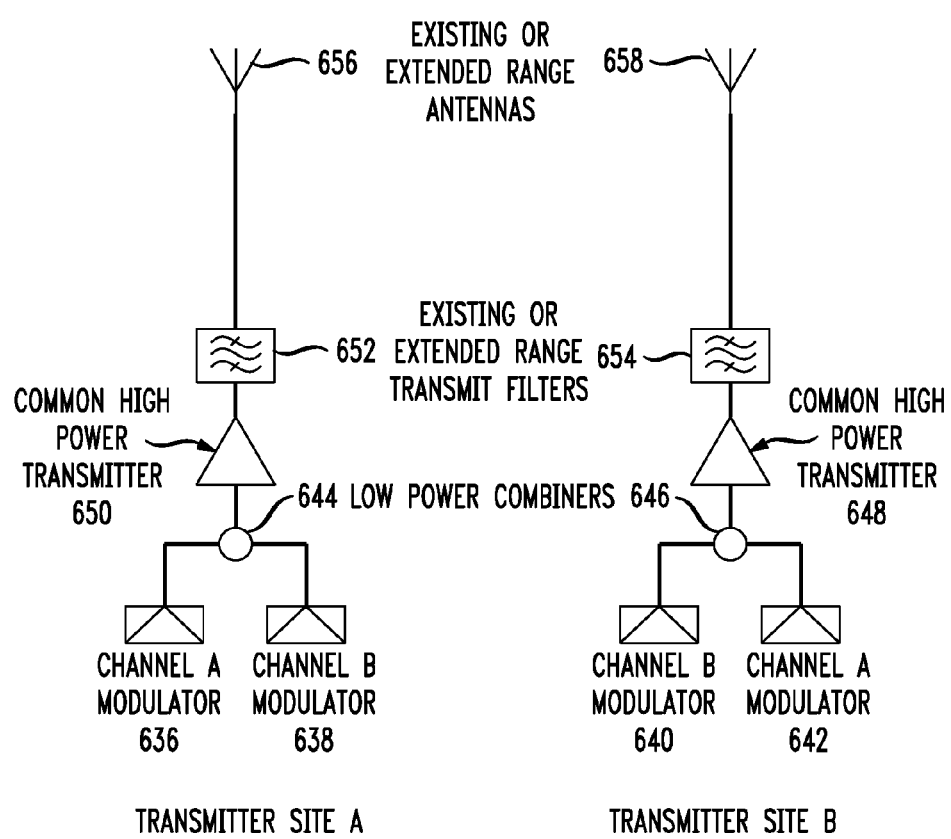

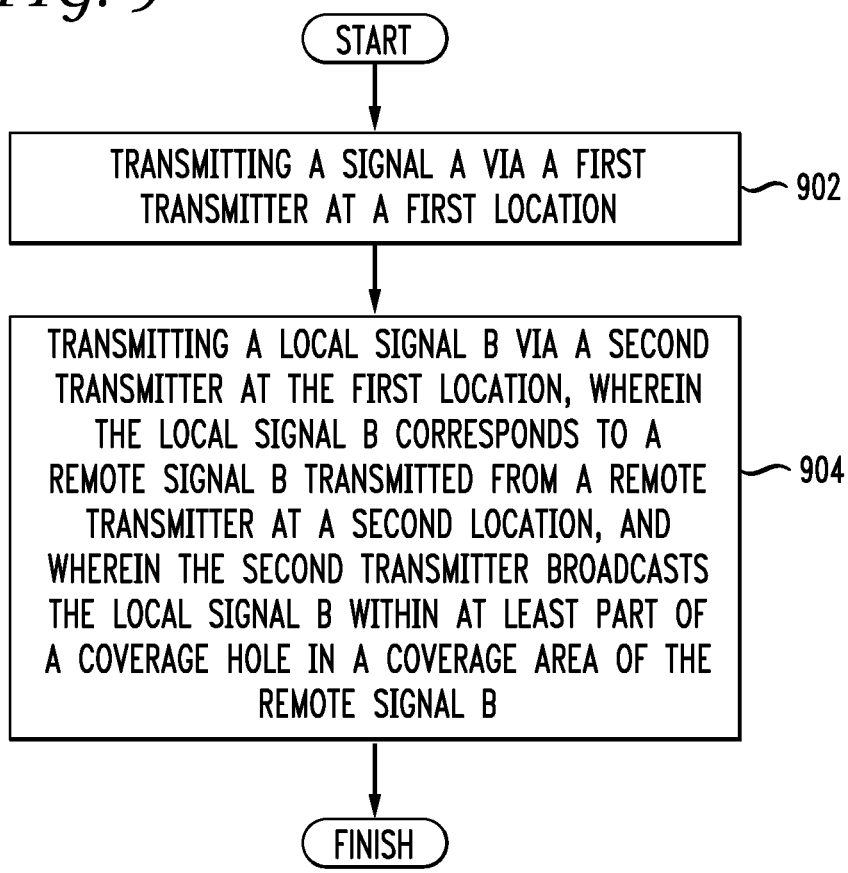

SYSTEM AND METHOD FOR BROADCAST STATION ADJACENCY

RELATED APPLICATION

The present application is a continuation of U.S. patent application Ser. No. 14/690,930, filed Apr. 20, 2015, which is a continuation of U.S. patent application Ser. No. 12/972,224, filed Dec. 17, 2010, now U.S. Pat. No. 9,013,541, issued Apr. 21, 2015, which is a continuation-in-part application of U.S. patent application Ser. No. 12/642,189, filed Dec. 18, 2009, now U.S. Pat. No. 8,610,832, issued Dec. 17, 2013, the contents of which are herein incorporated by reference in their entirety.

BACKGROUND

1. Technical Field

The present disclosure relates to wireless transmissions and more specifically to systems and methods of providing a supplemental signal transmission within a coverage hole, such as a region in a broadcast area where interference between a strong local signal and a weak remotely transmitted signal causes the remotely transmitted signal to be difficult or impossible to receive correctly. The supplemental signal carries the same program as the remotely transmitted signal and its transmission in the region proximate to the local signal enables detection of the program in the coverage hole.

2. Introduction

Currently broadcast stations, such as television transmitters, can only share frequency adjacent channel allocations if they are co-located. In the United States, the TV broadcast band is divided roughly as follows: VHF-Low includes channels 2-4 at 54-72 MHz and channels 5-6 at 76-88 MHz; VHF-High includes channels 7-13 at 174-216 MHz; and UHF includes channels 14-51 at 470-698 MHz. Channel 37 at 608-614 MHz is reserved for radio astronomy. This arrangement can vary from region to region. Each television station occupies approximately 6 MHz of bandwidth. For example, assume a station transmits channel 14 between 470-476 MHz and another station transmits channel 15 in an adjacent frequency band between 476-482 MHz. TV stations transmitting these signals can broadcast from a single tower with their respective antennas co-located on the tower. The signal strength of the respective channels in this scenario will generally be equal in radiating distances from the antennas for channels 14 and 15. However it is not always feasible or possible to broadcast all channels from a single location.

FIG. 2 illustrates one prior art approach 200 of broadcasting two signals from separately located broadcast stations. A first TV station broadcasts channel 14 via a first antenna from tower A to a first coverage area 202 and a second TV station broadcasts channel 15 via a second antenna from tower B to a second coverage area 204. In this configuration, the signal strengths of each transmitted signal decline more or less equally with distance away from each transmitter. In regions proximate to one of the broadcast stations, that broadcast station's signal overpowers the other signal, thereby creating a 'hole' 206, 208 in the reception of the other signal. Thus, a receiving device 210 in the coverage hole 208 is unable to distinguish channel 15 from channel 14 because the relative signal strength of channel 14 overpowers channel 15. Similarly, a receiving device 212 in the other coverage hole 206 is unable to distinguish channel 14 from channel 15. At point C, a receiving device can only receive the signal from tower A. At point D, a receiving device can receive signals from tower A and B. At point E, a receiving device can only receive the signal from tower B. A receiving device receives and processes the signal to produce an audio program, text, multi-media, television program, and/or some other form of data.

The existence of coverage holes is especially pronounced with frequency adjacent channels. The interference between the two channels A and B is shown by graph 300 of FIG. 3. This graph 300 illustrates the frequency/power correlation for channel A 302 transmitted from tower A and an adjacent channel B 304 transmitted from tower B. As shown in FIG. 3, the short distance between channels A and B further exacerbates interference between the two channels because the frequencies in the roll-off region of the stronger channel B overlap with a portion of the frequencies in channel A.

One way to reduce the interference between channels is to allocate a guard band or channel between the two adjacent channels. Guard bands are used for both terrestrial based communication and satellite communication. FIG. 4 illustrates graph 400 showing the use of a guard band between channels A and B. While this provides some benefit to reducing inter-channel interference, guard bands waste valuable spectrum which could be allocated for other uses. For example, if the tower configuration shown in FIG. 2 were deployed in a city, then the available stations for that city may be limited to every other channel. As another example, the Federal Communications Commission (FCC) may allocate channels 22, 24, 26, 28 and 30 for a certain geographic region and designate channels 23, 25, 27, and 29 as guard bands to prevent interference between channels. As can be seen, as more channels are provided in a market, more guard bands and thus more wasted spectrum must be allocated.

Further, with the advent of modern wireless communications, wireless operators in the US need a significant influx of new spectrum. Existing UHF (ultra high frequency) television broadcast bands are attractive to wireless communications for a number of reasons, but current television broadcast operators fear losing spectrum due to forced reallocation, forced sharing of over-the-air payload between stations, and increased costs for over-the-air service.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6C illustrates a first example transmitter tower configuration with shared antennas, feedlines, filters, and power amplifiers;

FIG. 9 illustrates an example method embodiment.

DETAILED DESCRIPTION

Figure 1:
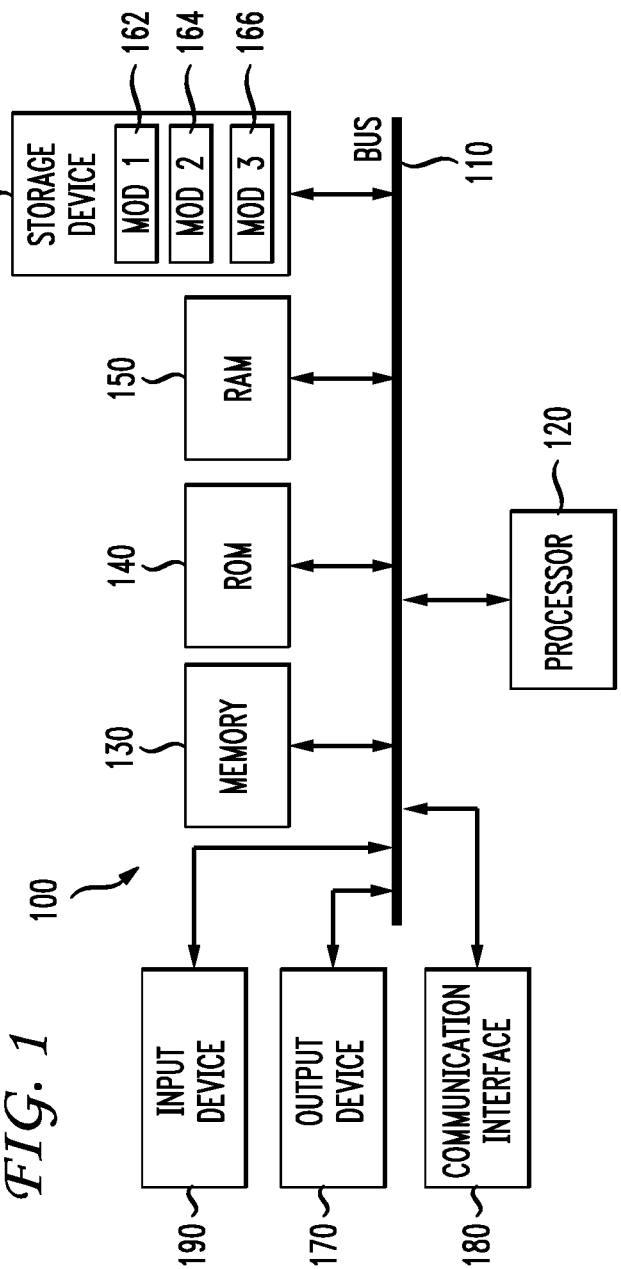
FIG. 1 illustrates an example system embodiment.
Figure 2:
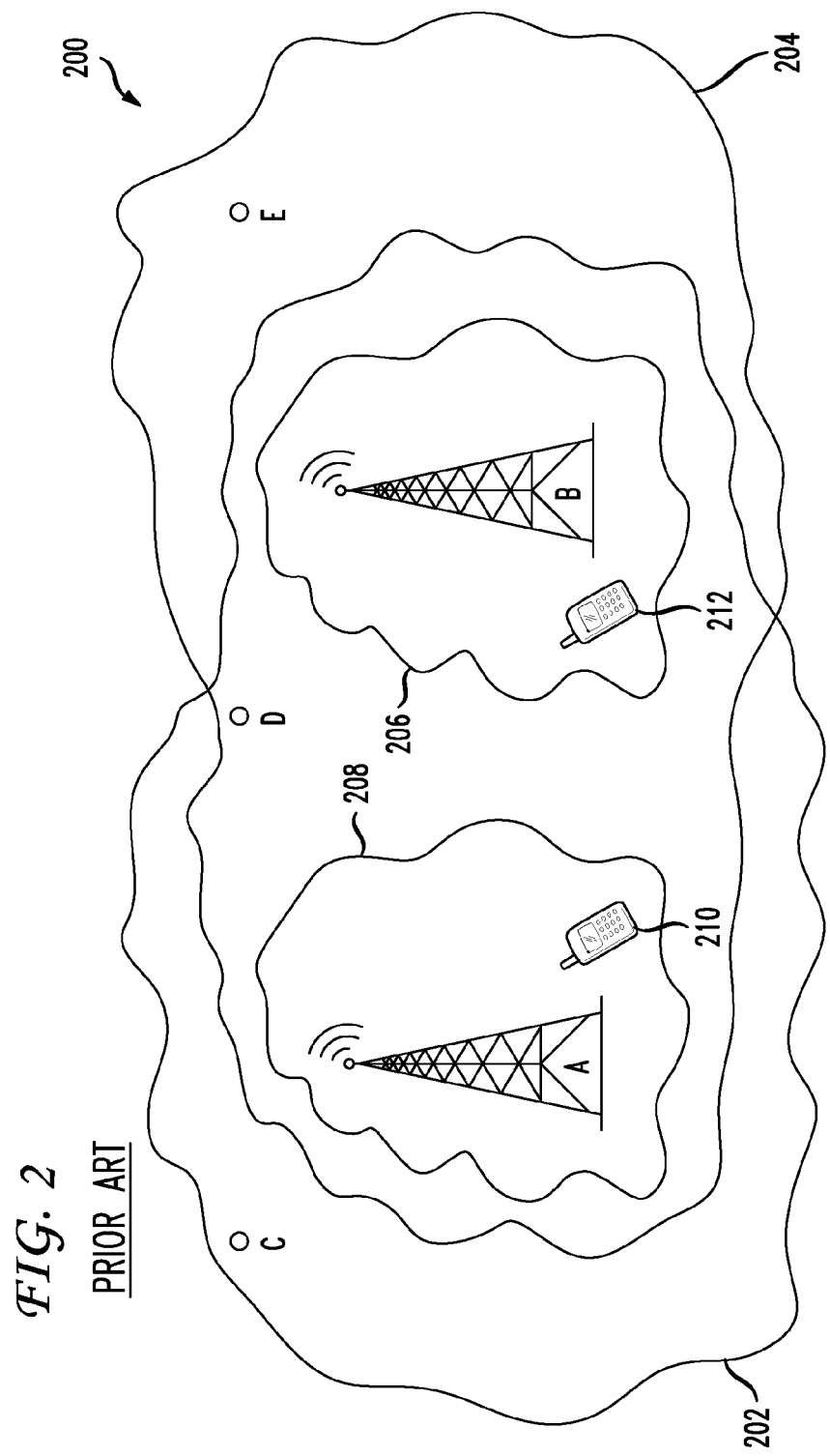
FIG. 2 illustrates a prior art interference of frequencies between two adjacent channels.
Figure 3:
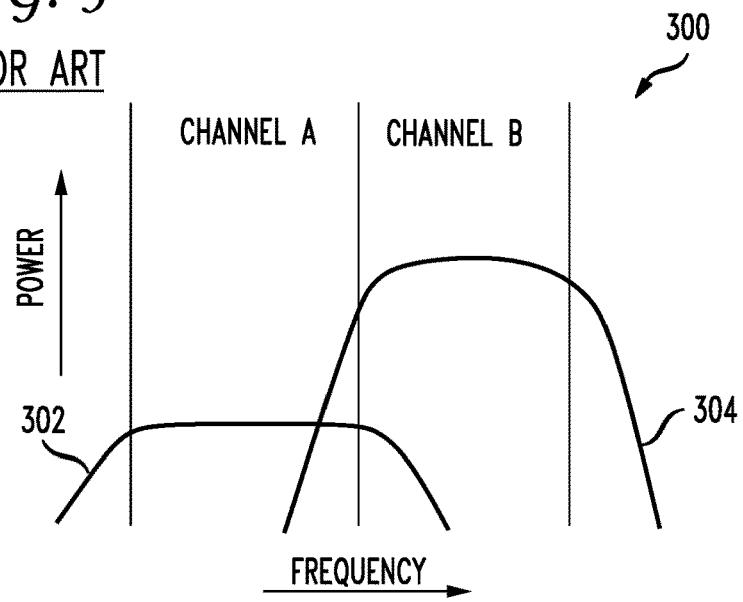
FIG. 3 illustrates interference between adjacent channels A and B.
Figure 4:
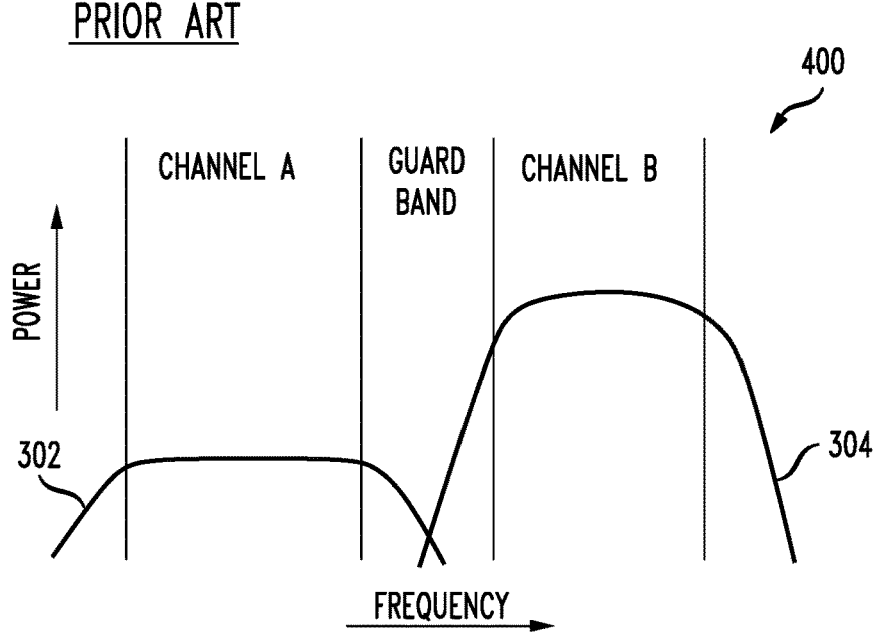
FIG. 4 illustrates the allocation of a guard band between channels A and B.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the deficiency in the art with respect to the need to allocate spectrum in the form of guard bands to prevent interference between transmission channels. This approach can be used to facilitate repacking of broadcast spectrum, such as the UHF broadcast television band. In one example, the FCC can migrate existing television broadcasters to the lower half of the existing UHF band, which is preferable due to the propagation characteristics of lower frequency transmissions. This vacates the upper half of the current UHF television band for reallocation and/or auction to wireless carriers. The upper half of the UHF band is preferable for wireless carriers due to antenna size impacts on infrastructure as well as mobile device hardware.

As shall be more fully explained below, the solution to this problem includes transmitting a supplemental signal from a local antenna that matches or corresponds to a remotely transmitted signal to eliminate the coverage hole without the need of guard bands. For example, if a station broadcasts its program at a remote tower in a frequency range of 470-476 MHz, and a coverage hole exists in a proximate region around a local tower that is far from the remote tower, a solution includes broadcasting a supplemental signal of the same program at 470-476 MHz from the local tower in the coverage hole to enable devices to detect the program. The various embodiments with respect to the concept are set forth below.

In one aspect, the approach disclosed herein is called selective single-frequency network (SFN) infill. Selective SFN infill addresses only those areas where there is an interference problem, such as the area immediately around an adjacent channel transmitter. One implementation colocates a low power SFN transmitter with an adjacent channel transmitter. A pair of adjacent channel non-colocated stations would each need an infill transmitter to combat the interference into the adjacent channel stations' coverage area that it generates. A very dense market would require at most two infill transmitters per station. Transmit power levels would be determined by extent of adjacent channel impact. For example, the ATSC standard requires at most only 28 dB of adjacent channel rejection so power levels could be on the order of 1/1000 of the main transmission. The ATSC standard can support SFN operation via frame tagging and GPS synchronization. Four different implementations of selective SFN infill are discussed in FIGS. 6A-6D. The disclosure turns to a discussion of background concepts, followed by a discussion of these four different implementations.

The hardware requirements for generating and transmitting the supplemental signal may or may not include a general purpose computer. FIG. 1 illustrates an example computing device which can be used in various ways within the various embodiments of the invention. The details of FIG. 1, which include a processor, bus, memory, and so forth, are discussed more fully below after a detailed discussion of the specific features of the various embodiments. The disclosure will therefore first discuss the exemplary transmitter tower configuration shown in FIG. 5. FIGS. 6A-6D will provide a more detailed discussion of the various hardware components which can implement the selective SFN infill approach. The disclosure will then turn to a discussion of a broadcast coverage map of FIG. 7, the example adjacent channels in FIG. 8, and finally to two example method embodiments in FIGS. 9 and 10.

Embodiments disclosed herein include systems, methods and non-transitory computer-readable storage media which relate to the generation and transmission of a supplemental signal associated with a remotely transmitted signal. This disclosure introduces concepts that can eliminate the coverage holes around transmission towers and can simultaneously eliminate the need for allocating guard bands which waste valuable spectrum. This disclosure can be used to free currently allocated spectrum for use by wireless communication devices and an ever-increasing flow of data over wireless networks. The disclosure now turns to FIG. 5.

Figure 5:
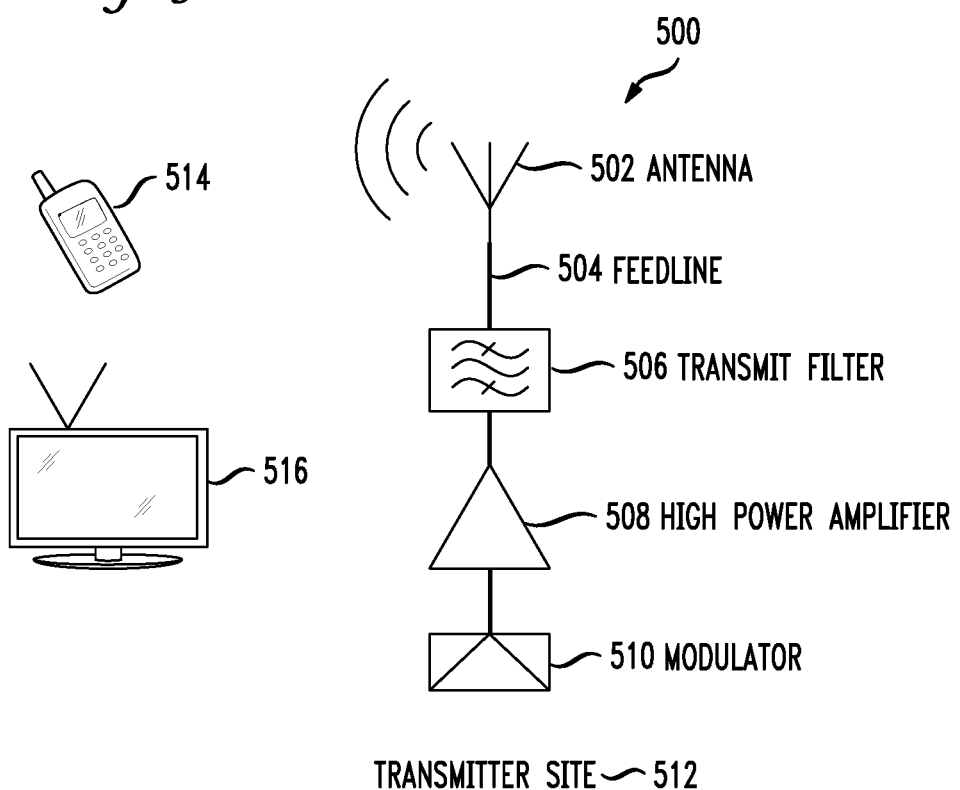
FIG. 5 illustrates an exemplary simplified broadcast transmitter.

FIG. 5 illustrates an exemplary simplified broadcast transmitter 500. The transmitter 500 can include an antenna 502 that transmits signals or channels from a transmitter site 512 to a certain geographic region. The antenna 502 is fed by a feedline 504, a transmit filter 506, a high power amplifier 508, and a modulator 510 which receives a signal from the studio to pass to the antenna for transmission. The transmission can be a radio frequencies broadcast to remote devices such as a television 516 or a mobile device 514, which then decode the received transmission to produce images, sound, video, and/or other data.

Figure 6A:
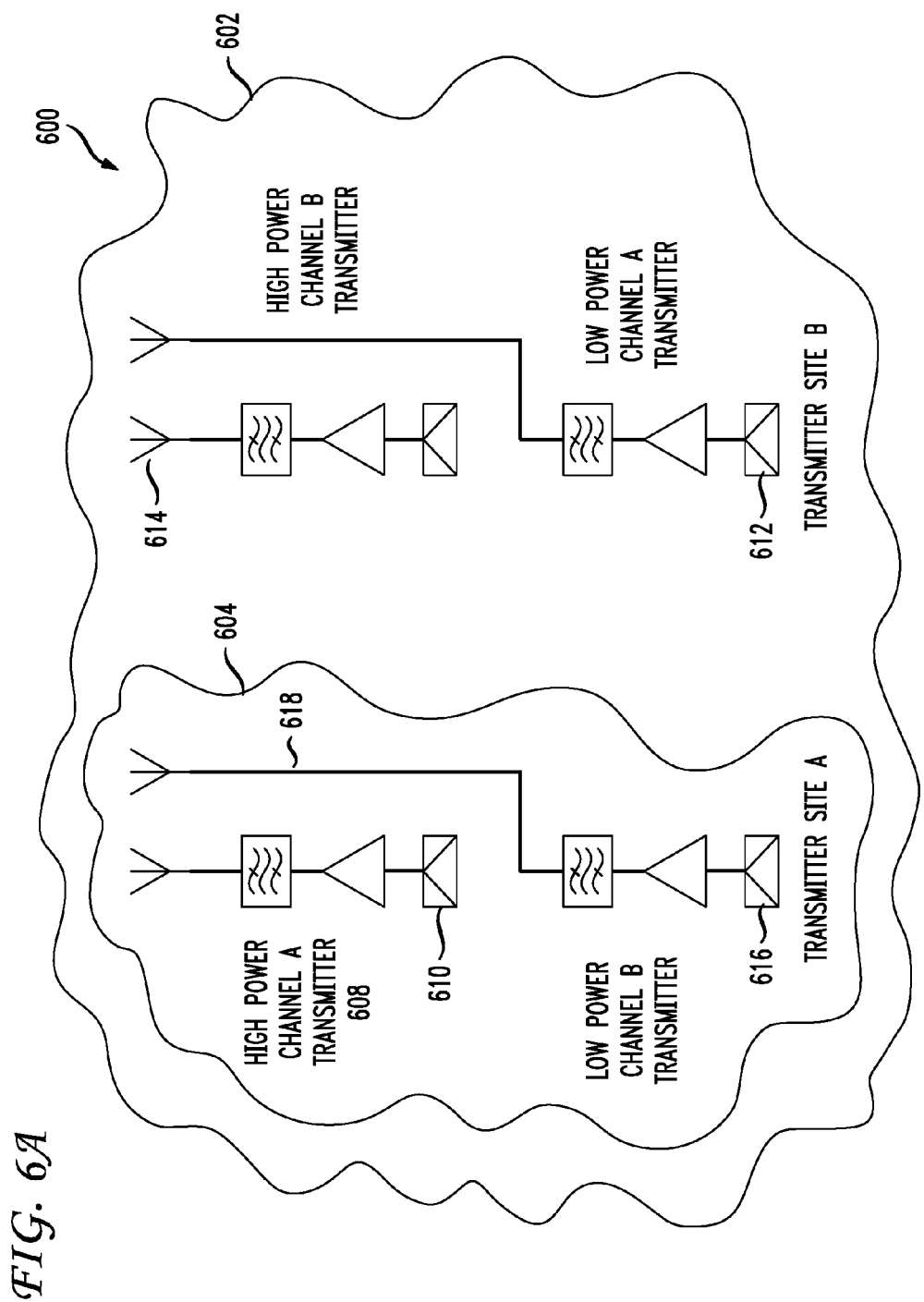
FIG. 6A illustrates an example transmitter tower configuration with separate antennas, feedlines, filters, and power amplifiers.
Figure 6B:
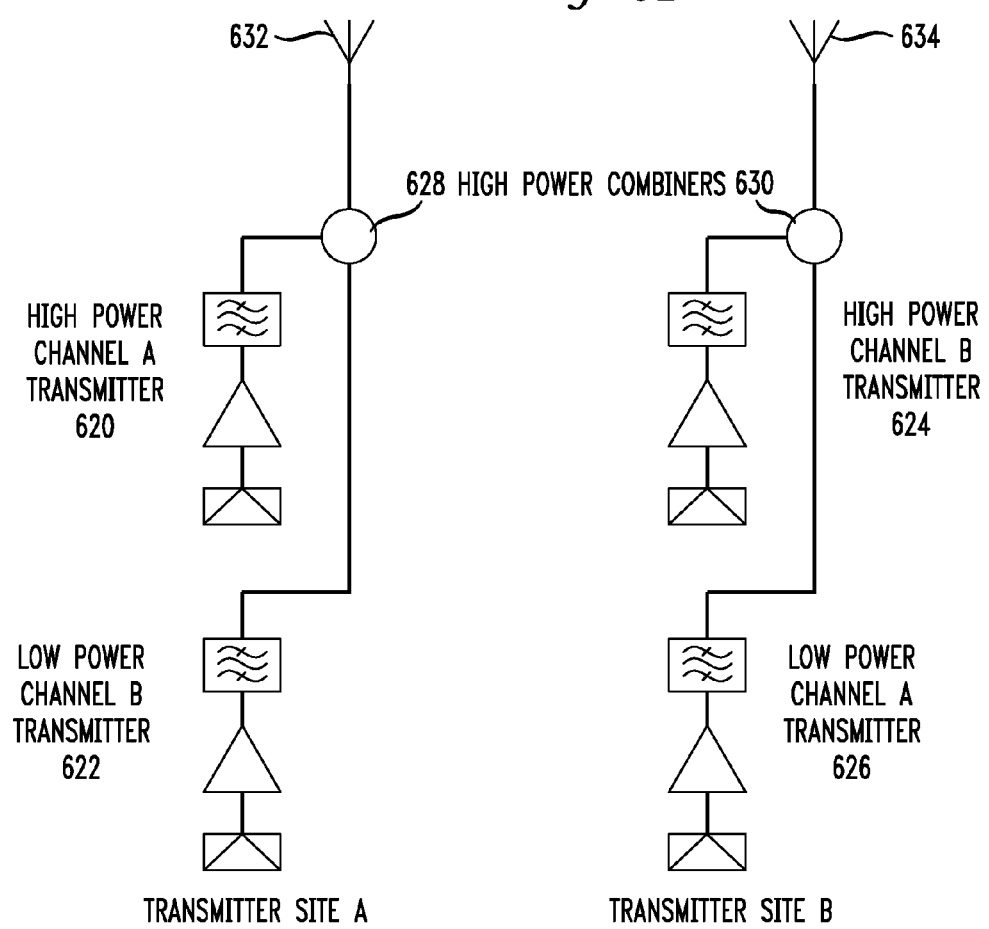
FIG. 6B illustrates an example transmitter tower configuration with shared antennas and feedlines and with separate filters and power amplifiers.
Figure 6D:
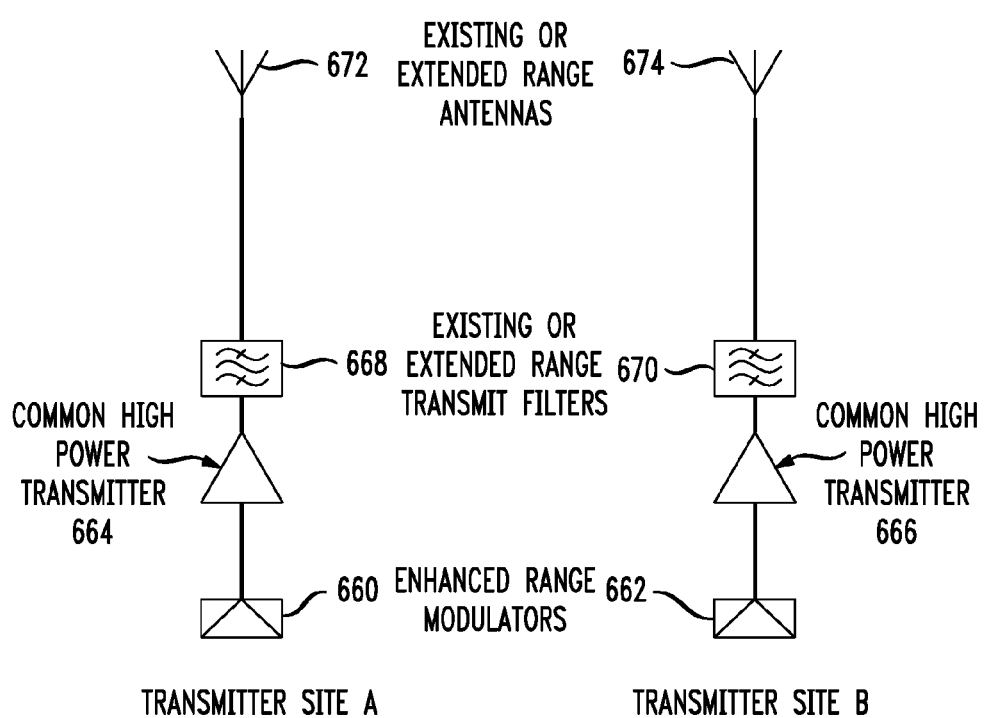
FIG. 6D illustrates a second example transmitter tower configuration with shared antennas, feedlines, filters, and power amplifiers.

The disclosure now turns to a discussion of the four different implementations for practicing selective SFN infill. FIG. 6A illustrates an implementation with separate antennas, feedlines, filters, and power amplifiers. FIG. 6B illustrates an implementation with shared antennas and feedlines and separate filters and power amplifiers. FIGS. 6C and 6D illustrate two different implementations with shared antennas, feedlines, filters, and power amplifiers. The disclosure now turns to the separate component implementation of FIG. 6A.

FIG. 6A shows an implementation 600 from two transmitter sites, site A and site B. Transmitter site A includes a high power channel A transmitter 608 fed by a first modulator 610 and a low power channel B transmitter fed by a second modulator 616. Transmitter site B includes a high power channel B transmitter 614 fed by a third modulator and a low power channel A transmitter fed by a fourth modulator 612. In this configuration, the high power channel B transmitter 614 broadcasts a signal for channel B over a given area 602. However, interference from the high power channel A transmitter 608 in an area 604, creating a coverage hole in area 602 where a receiver is unable to discern channel B from the high power channel B transmitter at transmitter site B. However, the low power channel B transmitter 618 broadcasts a signal for channel B within the coverage hole 604 such that a receiver within the coverage hole 604 can receive both channel A and channel B. A receiver within the coverage hole 604 can receive channel B from the low power channel B transmitter 618 exclusively or via a combination of the signals transmitted from the high power channel B transmitter and the low power channel B transmitter. The combination of the remote high power transmitter and a nearby low power transmitter, which each broadcast the same signal, allows a receiver within the coverage hole 604 to receive the signal clearly.

The coverage hole 604 can be defined as a region geographically proximate to a high power transmitter. Other causes can lead to coverage holes or affect the shape of coverage holes as well, such as beam steering, signal propagation characteristics, geography, interference with or reflection off buildings or other objects, relative signal strength and so forth. In one aspect, a coverage hole is not a 'hole' in the area 602, but merely a region in which the signal from the high power transmitter is insufficiently strong to be received. One example of such an area is a remote suburb of a city. The principles disclosed herein can also be used to extend the coverage area 602 of a high power transmitter by the use of one or more low power transmitters positioned to address the 'coverage hole'. These one or more low power transmitters can be located independently, or not at a same site as a high power transmitter.

FIG. 6B illustrates an implementation of selective SFN infill with shared antennas and feedlines and separate filters and power amplifiers. In this embodiment, the equipment at transmitter site A includes a high power channel A transmitter 620 with its own modulator, high power amplifier, and transmit filter, and a low power channel B transmitter 622 with its own modulator, high power amplifier, and transmit filter. Both the high power channel A transmitter 620 and the low power channel B transmitter 622 feed to a shared high power combiner 628 which combines the two signals, outputs the combined signal to a feedline for broadcast via a shared antenna 632. Conversely, at transmitter site B the equipment includes a high power channel B transmitter 624 with its own modulator, high power amplifier, and transmit filter, and a low power channel A transmitter 626 with its own modulator, high power amplifier, and transmit filter. Both the high power channel B transmitter 624 and the low power channel A transmitter 626 feed to a shared high power combiner 630 which combines the two signals, outputs the combined signal to a feedline for broadcast via a shared antenna 634.

The combined signal includes both channels A and B such that a receiver in what would be a coverage hole can receive both signals. While this example shows a combiner on two sites, some embodiments include a single combiner at one site, and other embodiments include more than two combiners at multiple sites. These figures are exemplary and do not limit the disclosure.

FIGS. 6C and 6D illustrate two different implementations of selective SFN infill with shared antennas, feedlines, filters, and power amplifiers. FIG. 6C shows two transmitters at site A and site B. The transmitter at site A includes a channel A modulator 636 and a separate channel B modulator 638. The outputs from these two modulators 636, 638 are fed to a low power combiner 644 which combines the two signals and outputs the combined signal to a shared high power transmitter 650, a shared transmit filter 652, feedline, and antenna 656. At site B, the transmitter includes a channel B modulator 640 and a separate channel A modulator 642. The outputs from these two modulators 640, 642 are fed to a low power combiner 646 which combines the two signals and outputs the combined signal to a shared high power transmitter 648, a shared transmit filter 654, feedline, and antenna 658. The shared transmit filters 652 can be existing transmit filters retrofitted as shared transmitters or can be extended range transmit filters. The major difference between the embodiment of FIG. 6C and the embodiment of FIG. 6B is where the signals from the modulators are mixed. In FIG. 6B, a high power combiner 628, 630 combines the signals after being amplified, and in FIG. 6C, a low power combiner 644, 646 combines the signals before being amplified. There is no requirement that both site A and site B use the same approach. The equipment at site A can be constructed according to FIG. 6A and the equipment at site B can be constructed according to FIG. 6C. The different physical configurations are compatible one with another.

FIG. 6D shows one final variation of selective SFN infill with shared antennas, feedlines, filters, and power amplifiers. In this example, the transmitter at site A includes a shared enhanced-range modulator 660 connected to a shared high power transmitter 664, a transmit filter 668, a feedline, and an antenna 672. Similarly, the transmitter at site B includes a shared enhanced-range modulator 662 connected to a shared high power transmitter 666, a transmit filter 670, a feedline, and an antenna 674. In this variation, the multiple signals for channel A and B are mixed either by the enhanced range modulators 660, 662 or at stage (not shown) prior to the enhanced range modulators 660, 662. In either case, the configurations shown in FIGS. 6A-6D result in providing coverage in at least part of a coverage hole.

In some implementations, a computer monitors the transmitters for compliance with a standard or threshold, such as a specific frequency, power level, and synchronization. In other implementations, in order to make the system operate as an SFN, the source material transmitted by each transmitter (main plus auxiliaries) is synchronized. The ATSC standard can support this type of operation. Synchronizing the source material is one way to prevent interference in the border areas between transmitters where neither signal is dominant.

Figure 7:
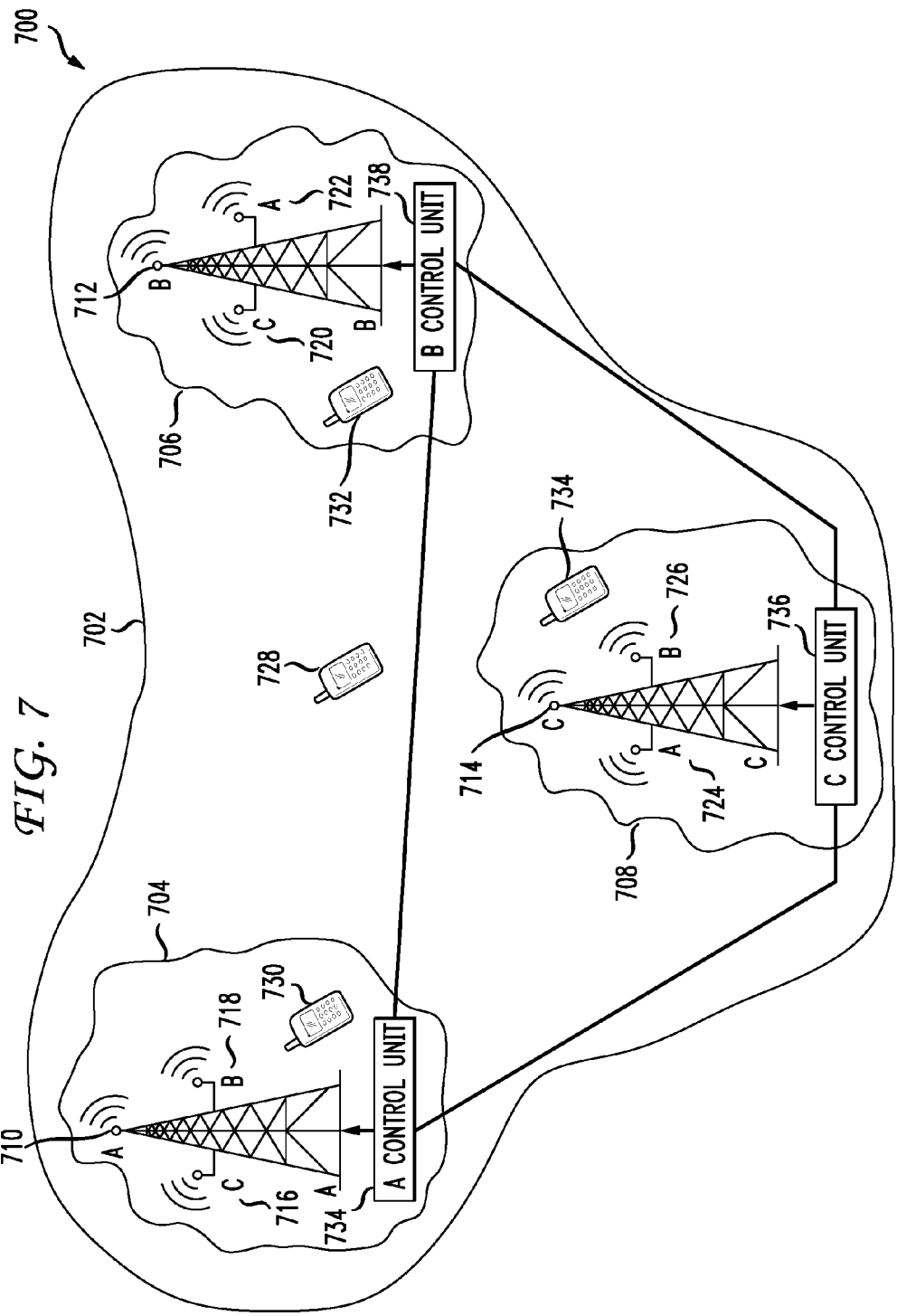
FIG. 7 illustrates an example broadcast coverage map of a channel A and adjacent channels B and C.

The disclosure now turns to a more complex example of three transmitters. FIG. 7 illustrates an example broadcast coverage map 700 of a channel A broadcast from tower A and adjacent channel B broadcast from tower B and channel C broadcast from tower C. FIG. 7 shall thus be used to further discuss a coverage map in which three channels are being broadcast in a region and where each respective tower can have coverage holes for two other adjacent channels. FIG. 7 shows a large coverage area 702 for each of the three towers A, B and C with respective coverage holes 704, 706, 708 around each tower. Receiver 728 is positioned within the coverage area 702 but not within one of the coverage holes. Thus receiver 728 can receive signals from all three main transmitters 710, 712, 714. However, by applying the principles set for the herein via the transmission of supplemental signals in coverage holes, a receiver within any of the coverage holes 704, 706, 708 will detect the respective local signal from a nearby local tower and adjacent frequencies from respective supplemental transmitter for that coverage hole.

Consider the coverage hole 704 around tower A. In this context, local tower A transmits a local signal that overpowers adjacent frequencies carrying remote signals B and C in the coverage hole 704. Supplemental transmitters B 718 and C 716 each transmit a supplemental signal such that a receiver 730 in the coverage hole 704 can detect signal B or C despite the proximity of the local transmitter 710. Control unit 738 from tower B communicates via a network (not shown) its supplemental signal B to control unit 734. Similarly, control unit 736 for tower C communicates a supplemental signal C to control unit 734 at tower A via a network (not shown). In a manner similar to the discussion above, these supplemental signals are processed and transmitted on antenna 710 together with the local signal A or separately on separate antennas 716, 718. In this respect, control unit 734 represents the various configurations available for signal processing according to the principles disclosed herein. The above solution enables device 730 in coverage hole 704 to detect local signal A and the programming associated with signals B and C.

Next consider the coverage hole 706 around tower B. Local tower B transmits a local signal from antenna 712 that overpowers adjacent frequencies A and C in coverage hole 706 proximate to local tower B. Supplemental transmitters A 722 and C 720 each transmit a supplemental signal such that a receiver 732 in the coverage hole 706 can receive signal A or C despite the proximity of the main transmitter 712 on tower B. Control unit 734 transmits the supplemental signal A to control unit 738 through a network (not shown) and control unit 736 communicates supplemental signal C through a network (not shown) to unit 738 for processing and transmitting these supplemental signals in the coverage hole 706. These supplemental signals are processed and transmitted on antenna 712 together with the local signal B or separately on separate antennas 720, 722. This enables device 732 to detect the local signal B and remote signals A and C.

Consider the coverage hole 708 in proximity to tower C. Local tower C transmits a local signal on antenna 714 that overpowers adjacent frequencies A and B in the coverage hole 708. Supplemental transmitters A 724 and B 726 each transmit a supplemental signal such that a receiver 733 in the coverage hole 708 can detect signal A or B despite the proximity of the local transmitter 714. Control unit 734 transmits the supplemental signal A to control unit 736 through a network (not shown) and control unit 738 communicates supplemental signal B through a network (not shown) to unit 736 for processing and transmitting these supplemental signals in the coverage hole 708. These supplemental signals are processed and transmitted on antenna 714 together with the local signal C or separately on separate antennas 724, 726. This enables device 733 to detect the local signal C and remote signals A and B.

Control units 734, 736, 738 each include all the necessary hardware to perform the steps disclosed herein. The communication link is shown between each control unit 734, 736 and 738 to communicate control signals, synchronization signals, and data signals as disclosed herein. Each of these control units can include the various other components shown in FIGS. 6A-D for managing the generation, processing and transmission of the respective supplemental signal at any particular tower and on one or more antennas.

The coverage holes may be different from the different remote signals. For example, tower B in FIG. 7 transmits local channel B the use of two supplemental antennas 720, 722 can limit the need for a guard band between channel B and channel A and a guard band between channel B and channel C. The coverage hole 706 for channel A around local tower B may be different in configuration from the coverage hole around local tower B for channel C. This is because channel A and channel C will likely have different propagation characteristics and power from their transmission towers. In one case, the system combines the two approaches of broadcasting the local signal and supplemental signals through one or both of a single local antenna and a supplemental antenna. This can be advantageous to address coverage holes of a particular shape, location, orientation, or size.

Figure 8:
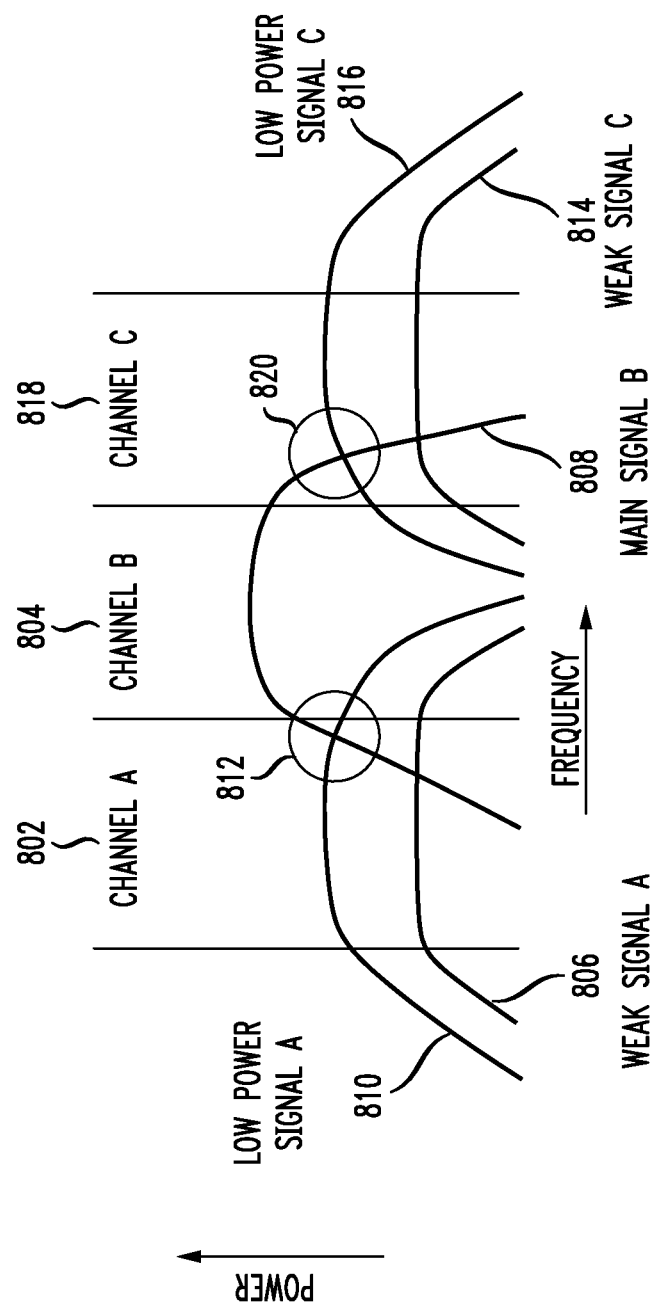
FIG. 8 illustrates an example of adjacent channels A, B and C and their relative transmission signal strengths.

FIG. 8 illustrates the frequency versus power relationship 800 between three channels 802, 804, 818. This power relationship applies in the context of the coverage hole 706 around tower B in FIG. 7. In this context, local channel B has the strongest signal strength with two adjacent weaker channels for remote channels A and C. With the geographic context of tower B and its coverage hole for remote main signals A and C from FIG. 7 in mind, the disclosure turns back to FIG. 8.

Shown in FIG. 8 is remote channel A 802 transmitting a signal which is a weak signal A 806 in the coverage hole around local tower B and a strong local channel B 804. The local tower B can include another antenna which radiates supplemental channel A 810 typically at a lower power relative to the signal strength of channel B. Lower power signal A 810 represents the supplemental version of remote signal A that is transmitted from a separate antenna (or a same antenna as the signal B 808) from tower B. The supplemental signal 810 is broadcast at a lower power because it does not need to match the power of channel the local signal B 808, but just needs to be at a sufficient power to be detected by a receiver. In some portions of the coverage hole, the remote signal 806 is not detectable at all, so a receiver only detects the low power signal A 810. As the receiving device moves toward a boundary of the supplemental transmitter, a simulcast effect can occur in which the receiver detects both the weaker remote signal A 806 and the supplemental lower power supplemental signal A 810. In these cases, the remote signal channel A is boosted by the supplemental channel A to a level just strong enough 812 to be detectable within the coverage hole.

The power levels chosen for the supplemental lower power signal 810 can be static or dynamic. While they are typically static and determined based on known power levels of the main signal A and other factors, in one aspect, the system can receive feedback data such as reception quality at various devices in a coverage hole, weather conditions, transmission conditions for channel A and channel B, and utilize that data to vary the signal power for signal 810. For example, if the system receives data that channel B is down for some reason, then it would be a waste of energy to continue transmitting the low power signal 810 proximate to channel B's main transmitter. In this case, the system ceases transmitting the supplemental signal until the condition returns back to normal with the transmission of channel B. Ionospheric or atmospheric conditions may also cause variations in the relative signal strengths which can cause the system to implement dynamic adjustments to the supplemental signal 810.

The disclosed solution addresses the near/far problem described herein. The solution allows the deployment of transmitters or the transmission of signals on adjacent channels without a guard band. In the case of television receivers, adjacent channel rejection is typically on the order of 30 dB or more. By co-locating a lower power transmitter with the offending transmitter, sufficient signal strength can be provided in the desired channel to overcome the offending adjacent channel signal. Co-location generally means that both transmitters are in the same location, such as on the same transmitter tower or structure, even if they are not in the exact same position on the tower or on a nearby tower or structure. The lower power signal only needs to overcome the difference between the adjacent channel signal and the matching signal from the remote primary transmitter. Therefore, the power level for signal can be much lower than the power level of the signal propagated by the local station's primary transmitter. One way to prevent interference between the main and supplemental transmitters is to build them as a single frequency network. The supplemental transmitter output can be 100 to 1,000 times lower than the primary transmitter (30 dB-10 dB capture ratio), dependent on the situation. Output can also be higher or lower than that range. While in most implementations, the output of the lower power transmission is fixed, in other aspects the lower power transmission is adjusted based on feedback or adjusted relative to the output power of the interfering transmitter.

This technique allows for closer packing of broadcast stations and placement of more stations in each market. This technique can also allow the movement of broadcast stations into a narrow block of spectrum to free up spectrum space for auction for mobile broadband or other services. For example, instead of spreading out television broadcast channels on channels 22, 24, 26, 28 and 30 (with guard channels 23, 25, 27 and 29 interspersed in between), using this technique, these channels can be compacted to channels 21, 22, 23, 24 and 25. Thus channels 26, 27, 28, 29 and 30 can be redeployed for other uses such as cellular or data communications. This technique can also be used to improve receiver reception in areas near the supplemental transmitter that would normally have suffered from shadowing from the main transmitter. This technique is not limited to improving reception due to interference from another transmitter. The principles disclosed herein can be used to improve reception from any sort of localized interference and can further provide broadcast services to rural or small target coverage especially in cases of co-channel operation from an adjacent market. In short, this disclosure can be useful in almost all spectrum shortage situations to enable more efficient use of the spectrum.

In addition to addressing the issue of coverage holes, the principles disclosed herein can also apply to border or fringe areas. Consider the example of two separate cities located 100 miles apart. Typically the FCC will not reassign the same channel or adjacent channel in both cities because of interference effects from fringe reception. If one city has a transmitter on channel 20, the other city located near the coverage boundary of that transmitter is precluded from having a transmitter on channel 20 or channels 19 and 21 because the relative strength of the two signals in the coverage boundary area causes interference and thus difficulties in reception.

However, an auxiliary or supplemental transmitter at lower power can overcome this problem and, in effect, extend the channel 20 coverage area to the fringe market. As with the other embodiments discussed herein, the supplemental transmitter may transmit via the same antenna as a main transmitter or may transmit via a separate antenna. This approach can be helpful for specific communities of interest on the fringe of a particular coverage area and prevent channel interference in remote areas. Beam steering may also be applied according to known principles in this example to focus the supplemental transmitted signal to the particular coverage area or a part of the coverage area.

The power, positioning, height, direction, and other variables related to the supplemental transmitters can be determined based on the type of antenna, power of the main transmitter, the power level required for the supplemental signal, and/or other relevant factors. In another aspect, the system inserts or injects the supplemental signal in the main signal and processes the supplemental signal through the same power amplifier, feedline and antenna as the main signal. This approach can bring high performance at a low cost, depending on the frequency characteristics and capabilities of the antenna according to principles known in the art.

In order to achieve positive interaction between the weak remote signal A 806 and the supplemental lower power signal 810 as shown in FIG. 8, the system receives a feed of the original channel through a cable or through another communication mechanism such as microwave transmission, satellite, etc. The system preferably does not simply rebroadcast a weaker signal (weak remote signal transmitted from tower A in FIG. 7) received directly via the air interface at tower B because propagation delays or differences in the transmission paths lead to phase issues. In order to address this issue if it arises, the main signal transmitted from tower A and the corresponding supplemental signal can be almost phase-locked with each other to eliminate interference. Preferably, the signals are not fully phase-locked or linked together because, depending on the geography of the coverage hole, the two signals would reinforce each other when in phase and cancel each other out when out of phase. Therefore, it can be preferable to incorporate a slight offset to eliminate this issue.

If the coverage hole does not have characteristics that would cause the signals to either reinforce or cancel either other but rather solely reinforce each other, then the system can be designed to fully phase-lock the signals, which can reduce the necessary power to achieve the desired detectability by a receiver in the coverage hole.

The disclosure now returns to FIG. 8. The system can apply the same approach to an adjacent channel C on the other side of local channel B by applying a lower power supplemental signal C 816 to boost the weak remote signal C 814 in order to overcome interference from the signal B 808 on adjacent channel signal B. Feature 820 of FIG. 8 represents a point where the lower power supplemental signal C 816 is strong enough to be detected by a device in the coverage hole around tower B. Where first and second supplemental signals are broadcast from a location, such as a supplemental signal 810 for channel A and a supplemental signal 816 for channel C being broadcast from the same location as a main signal B 808, the supplemental channels are both adjacent to the main channel.

Having disclosed some basic system components and concepts, the disclosure now turns to the exemplary method embodiment shown in FIG. 9. This embodiment focuses on the method of applying the principles disclosed herein for transmitting a local and supplemental signal from the same common physical antenna. For the sake of clarity, the method is discussed in terms of an exemplary system such as is shown in FIGS. 6A-D configured to practice the method.

The system can include a radio control unit or module that controls the various amplifiers and filters to transmit via an antenna the local signal and supplemental signals. Both signals can be processed by the same amplifier and filter or separate amplifiers and filters. The system transmits a signal A via a first transmitter at a first location (902). The system transmits a local signal B via a second transmitter at the first location, wherein the local signal B corresponds to a remote signal B transmitted from a remote transmitter at a second location, and wherein the second transmitter broadcasts the local signal B within at least part of a coverage hole in a coverage area of the remote signal B (904). For example, an amplifier, filter and the feedline to tower A may process both local channel A and the supplemental channel B. As noted above, the signal may be fully phase-locked with the local signal or slightly offset. An additional or secondary supplemental signal can also be broadcast such that lower power signals are broadcast at frequencies both higher and lower than the local signal for a particular location.

Where multiple supplemental signals are broadcast with a local signal at any particular location and from a common antenna, each supplemental signal can be treated independently with respect to whether they are combined at an amplifier, combined at the filter, or separately inserted into the signal broadcast through the common antenna. For example, a first supplemental signal may be combined with a local signal at the amplifier while a second supplemental signal may be combined following the amplifier stage to the existing local signal and first supplemental signal.

With the local signal and the supplemental signal both being transmitted from the same antenna, various ways of processing these signals can be employed. For example, lower level versions of these signals can be combined prior to amplification. Those of skill in the art will understand how these signals would be mixed and processed prior to insertion into a common amplifier. In another aspect, the local signal and the supplemental signal may have different transmitters and different amplifiers and combined at a power amplifier output stage. Thus, in the example of transmitting from antenna on tower A, the supplemental signal from supplemental control unit would be combined with the local signal at a point either at the output of amplifier or at a later stage (via common filter processing or separate filter processing) and fed to the antenna. In this respect, various modules or control units are discussed which can be combined in different ways to perform particular functions within the system. For example, where a common antenna transmits the supplemental signal and the local signal, a module for processing these signals may include the amplifier of supplemental control unit, the amplifier from control unit and a common filter which would receive two amplified signals and filter them for communication to the antenna.

The transmitters can transmit radio signals such as analog television signals, digital television signals, audio signals (e.g. AM and FM radio signals), and/or data signals. In some cases, multiple streams of information are multiplexed into the same signal. The transmitter can include or be associated with a receiver that communicates using a signal associated with the second signal. This can be useful in HAM radio transmissions, cellular phone communications, or any other two-way radio based communications, for example. The transmitted signals can be part of a broadcast.

The supplemental signal is broadcast at sufficient power to overcome interference in a coverage hole of the remote transmitter signal caused by the local signal. The coverage hole is typically defined as a geographic region proximate to the location of the local antenna where the signal strength of the local signal overpowers and thus prevents detection of the remote signal in the region using conventional receiving equipment. In one aspect, the processing components associated with the supplemental signal are also proximate to the tower. In the context of radio signal transmissions, generating a signal, amplifying the signal, and signal loss between the generator and the radiating element/antenna, "proximate to" would be understood by one of skill in the art. For example, proximate can mean from 0 to 10 miles away from the radiating tower because at distances further than that the signal would be lost and would need to be boosted. The ranges of acceptable distances for "proximate to" can depend on transmission type, transmission strength, other interfering signals, and other factors known to one of skill in the art.

An additional or secondary supplemental signal can also be broadcast such that lower power signals are broadcast at frequencies both higher and lower than the main signal for a particular location. Of course, receiving equipment of enhanced selectivity and sensitivity is more capable of discriminating even faint signals in the face of overpowering interference, but this approach allows conventional receiving equipment, such as standard television antennas, FM radios in cars, cellular phone antennas, and so forth, to receive a signal in a coverage hole without the extra cost and burden of receiver modification, additional equipment, and/or additional signal processing or power requirements.

The system can further receive, via a feedback module, feedback from a receiver station in the coverage hole and adjust, via an adjustment module, at least one of power, frequency, and directionality of the supplemental antenna based on the feedback. The system can perform these functions via a feedback module that can receive data from any number of sources such as receivers in various regions, weather data, performance data of transmitters and signal strengths, etc. An adjustment module utilizes the feedback information to make appropriate modifications to the supplemental transmitter. The system can disable the supplemental transmitter based on the feedback. In some cases, the supplemental transmitter transmits in the range of 100 to 1,000 times less power than the first main transmitter.

Any aspect of the transmitters and/or receivers described herein can include one or more hardware component of the device of FIG. 1 and any other necessary hardware components. As noted above, various components or modules in the overall configuration of a system operating as disclosed herein can utilize computers for various functions. The disclosure will next turn to a brief discussion of a general purpose computer system which can be used as part of any component in the particular approaches described above. In some instances, the amplifiers, filters and other known equipment used to generate, amplify and radiate signals into the air interface, will not use general purpose computers but may use other known hardware elements or may have integrated therein components such as processors and memory. All such combinations of radio equipment and computer components are considered within the scope of this disclosure. Computing devices can control any or all of the equipment described herein. The disclosure now turns to a general discussion of exemplary components of such computing devices.

With reference to FIG. 1, an exemplary system 100 includes a general-purpose computing device 100, including a processor 120 and a system bus 110 that couples various system components including the system memory 130 such as read only memory (ROM) 140 and random access memory (RAM) 150 to the processor 120. A storage device 160 on the bus 110 can store modules configured to control the processor 120 to perform certain steps, such as module 1 162, module 2 164, and module 3 166. Other hardware modules can interact with the processor or each other via the bus 110, including an output device 170, such as a display, an input device 190 such as a keyboard or mouse, and a communication interface 180 such as a wired or wireless network connection.

The various embodiments described above are provided by way of illustration only and should not be construed to limit the scope of the disclosure. For example, the selective SFN infill techniques disclosed herein can be used to repack the broadcast television spectrum, the FM radio spectrum, or any other broadcast spectrum. Those skilled in the art will readily recognize various modifications and changes that may be made to the principles described herein without following the example embodiments and applications illustrated and described herein, and without departing from the spirit and scope of the disclosure.

I claim:

1. A method comprising:
   transmitting, from a transmitter antenna at a location of a system, a signal A, wherein the signal A interferes with a remote signal B communicated to the system and a remote signal C communicated to the system;
   generating a local signal based on the remote signal B and the remote signal C, wherein the local signal comprises a local signal B and a local signal C and wherein the local signal B has a phase B based on the remote signal B and the local signal C has a phase C based on the remote signal C; and
   transmitting the local signal from the system.

2. The method of claim 1, wherein the transmitter antenna comprises a first modulator, a first amplifier, and a first filter, and wherein a second transmitter antenna for transmitting the local signal from the system comprises a second modulator, a second amplifier, and a second filter.

3. The method of claim 1, wherein the local signal comprises a local signal B and a local signal C.

4. The method of claim 1, wherein the phase B of the local signal B is synchronized and in phase with the remote signal B and wherein the phase C of the local signal C is synchronized and in phase with the remote signal C.

5. The method of claim 4, wherein the local signal B is transmitted from a second transmitter antenna and the local signal C is transmitted from a third transmitter antenna.

6. The method of claim 5, wherein the remote signal B and the remote signal C are transmitted from separate locations.

7. A system comprising:
   a processor; and
   a computer-readable storage medium having instructions stored which, when executed by the processor, cause the processor to perform operations comprising:
   transmitting, from a transmitter antenna at a location of a system, a signal A, wherein the signal A interferes with a remote signal B communicated to the system and a remote signal C communicated to the system;
   generating a local signal based on the remote signal B and the remote signal C, wherein the local signal comprises a local signal B and a local signal C and wherein the local signal B has a phase B based on the remote signal B and the local signal C has a phase C based on the remote signal C; and
   transmitting the local signal from the system.

8. The system of claim 7, wherein the transmitter antenna comprises a first modulator, a first amplifier, and a first filter, and wherein a second transmitter antenna for transmitting the local signal from the system comprises a second modulator, a second amplifier, and a second filter.

9. The system of claim 7, wherein the local signal comprises a local signal B and a local signal C.

10. The system of claim 7, wherein the phase B of the local signal B is synchronized and in phase with the remote signal B and wherein the phase C of the local signal C is synchronized and in phase with the remote signal C.

11. The system of claim 10, wherein the local signal B is transmitted from a second transmitter antenna and the local signal C is transmitted from a third transmitter antenna.

12. The system of claim 11, wherein the remote signal B and the remote signal C are transmitted from separate locations.

13. The computer-readable storage device of claim 11, wherein the phase B of the local signal B is synchronized and in phase with the remote signal B and wherein the phase C of the local signal C is synchronized and in phase with the remote signal C.

14. A computer-readable storage device storing instructions which, when executed on a computing device, cause the computing device to perform operations comprising:
   transmitting, from a transmitter antenna at a location of a system, a signal A, wherein the signal A interferes with a remote signal B communicated to the system and a remote signal C communicated to the system;
   generating a local signal based on the remote signal B and the remote signal C, wherein the local signal comprises a local signal B and a local signal C and wherein the local signal B has a phase B based on the remote signal B and the local signal C has a phase C based on the remote signal C; and
   transmitting the local signal from the system.

15. The computer-readable storage device of claim 14, wherein the transmitter antenna comprises a first modulator, a first amplifier, and a first filter, and wherein a second transmitter antenna for transmitting the local signal from the system comprises a second modulator, a second amplifier, and a second filter.

16. The computer-readable storage device of claim 14, wherein the local signal comprises a local signal B and a local signal C.

17. The computer-readable storage device of claim 16, wherein the local signal B is transmitted from a second transmitter antenna and the local signal C is transmitted from a third transmitter antenna.

* * * * *